United States Patent
Cragun et al.

(10) Patent No.: US 6,937,950 B2
(45) Date of Patent: Aug. 30, 2005

(54) ANIMATED GRAPHICAL OBJECT NOTIFICATION SYSTEM

(75) Inventors: Brian John Cragun, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 10/329,905

(22) Filed: Dec. 26, 2002

(65) Prior Publication Data

US 2004/0128093 A1 Jul. 1, 2004

(51) Int. Cl.⁷ .......................... G06F 19/00; G06T 13/00
(52) U.S. Cl. ........................................ 702/71; 345/473
(58) Field of Search .............................. 345/473, 474, 345/475; 702/71, 176, 177, 178, 179, 187

(56) References Cited

U.S. PATENT DOCUMENTS

| | | | | |
|---|---|---|---|---|
| 5,706,411 A | * | 1/1998 | McCormick et al. | 358/1.14 |
| 6,018,711 A | * | 1/2000 | French-St. George et al. | 704/275 |
| 6,278,456 B1 | * | 8/2001 | Wang et al. | 345/700 |
| 6,392,669 B1 | * | 5/2002 | Matoba et al. | 345/751 |
| 6,600,496 B1 | * | 7/2003 | Wagner et al. | 345/716 |
| 6,606,479 B2 | * | 8/2003 | Cook et al. | 434/350 |
| 6,657,643 B1 | * | 12/2003 | Horvitz et al. | 345/764 |
| 6,687,678 B1 | * | 2/2004 | Yorimatsu et al. | 705/8 |
| 2002/0013724 A1 | * | 1/2002 | Kudo et al. | 705/9 |
| 2002/0051017 A1 | * | 5/2002 | Wishoff | 345/774 |
| 2002/0056090 A1 | * | 5/2002 | Wagner et al. | 725/32 |
| 2003/0167167 A1 | * | 9/2003 | Gong | 704/250 |

OTHER PUBLICATIONS

Internet Web page at helpdesk.princeton.edu/kb/display-.plx?id=8827 entitled "How to alter, turn off or remove Microsoft Office Asisstant (aka Mr. Paper Clip)", dated Mar. 7, 2000.*

* cited by examiner

Primary Examiner—Patrick J. Assouad
(74) Attorney, Agent, or Firm—Moser, Patterson & Sheridan, LLP

(57) ABSTRACT

Embodiments of the invention generally provide for a computer-based notification method, apparatus and article of manufacture. In one embodiment, an alert/notification includes displaying one or more animated graphical objects in response to a user-specified event, where attributes of the animated graphical objects are user-defined.

27 Claims, 9 Drawing Sheets

Tabs: BASIC | APPEARANCE | BEHAVIOR — 302

- TEXT: CALL JOHN — 304
- BEGIN: 08:00 AM — 306 | 2/16/2002 — 308
- DEADLINE: 05:00 PM — 320 | 2/16/2002 — 314
- IMPORTANCE: HIGH — 322
- REPEAT: WEEKLY — 324

PIGGYBACK ON ✓ — 310
PHONE CALLS — 312

IMAGE: TELEPHONE — 316
SOUND: RINGING — 318

ANIMATED GRAPHICAL OBJECT NOTIFICATION SYSTEM

BACKGROUND OF THE INVENTION

1. Field of the Invention

The invention generally relates to data processing and more particularly to an animated graphical notification method and system.

2. Description of the Related Art

A computer-based alarm (notification or reminder) is often used to inform a computer user of an event such as an appointment. Typically, the alarm must be previously programmed by the computer user with event information. Event information may include a date for the event, a specific start time for the event, a specific end time for the event, a list of persons scheduled to meet for the event, or other relevant data. The reminder may also be programmed to notify the computer user of the event at a predetermined time prior to the event. At the predetermined time, a notification may appear on the computer user's screen, notifying the computer user about the event.

Dialog popups and/or icons are popular notification techniques which appear on the computer user's screen in response to a programmed alarm setting. The dialog popup is a textual notification technique used to remind the computer user that the event is impending using text messages. The icon reminder is a graphical notification technique that displays icons on the computer screen at the predetermined time to graphically notify the user of an event. Often, the dialog popup and graphical reminder are used in conjunction.

Typically, the user has to configure the reminder time, the duration of time the reminder is to be displayed, and any attributes such as sound to be used in conjunction with the reminder. For example, a reminder for a calendar event such as a dentist appointment may be set for particular date, time, duration, dialog, and alarm sound. Often, computer-based notifications are used for events other than time events. For example, a user may set a reminder to activate when an airline flight ticket price is within a certain price range. When the airline ticket price is within the predetermined price range, the user may be sent an alert notifying them that the ticket price is within the predetermined range.

Generally, once the reminder appears on the computer user's screen, the computer user must deal with the reminder in some way. Typically, the computer user may be required to click or double-click on the icon and/or dialog popup to display the event information or modify the reminder. The computer user may often choose to ignore, dismiss, snooze, or postpone the reminder. Unfortunately, reminders may activate when a user is not present or distracted, thereby causing the user to miss the event. For example, if a computer user momentarily steps away from the computer or is distracted when the reminder activates, and does not use the computer for a sufficient period of time, a screen-saver may hide the reminder and therefore cause the user to miss the reminder entirely, even if the user is nearby. Reminders may also be forgotten or missed by the user simply ignoring the reminder, or by hitting the "snooze" feature of the reminder system multiple times, for example. Thus, users may not want to dismiss a conventional warning for fear of forgetting, yet leaving the warning in place may make it difficult or impossible to continue using the computer, particularly in the case of non-modal window notifications (i.e., windows which must be acknowledged (e.g., by pressing an OK button) prior to resuming any other activity).

Therefore, there is a need for a computer-based reminder system that is reliable and effective in reminding a user of predetermined events.

SUMMARY OF THE INVENTION

Embodiments of the invention generally provide for a computer based notification method and system. In one embodiment, the invention generally provides a method of generating a computer-based notification. The method includes receiving from a user input and configuration settings of a notification responsive to the event. The notification includes at least one animated graphical object. The method further includes activating, when the event occurs, at least one animated graphical object, and displaying the at least one activated animated graphical object on a display screen.

In another embodiment, the invention generally provides for a computer readable medium containing a notification program which, when executed, performs a notification operation including determining when a user-specified event occurs, activating, according to user-specified configuration settings, one or more animated graphical objects in response to the event, displaying the one or more animated graphical objects on a display, and modifying attributes of the displayed one or more animated graphical objects according to the user-specified configuration settings.

In another embodiment, the invention generally provides for a computer, comprising a display, a data repository containing event information specifying a plurality of user-defined events and one or more animated graphical objects associated with the plurality of user-defined events where attributes of the animated graphical objects are user-defined. The computer also includes a notification program and a processor configured to at least execute the notification program and perform an operation which includes determining an occurrence of a user-defined event, activating, according to user-specified configuration settings, at least one animated graphical object in response to the user-defined event, displaying the at least one animated graphical object on the display, and modifying attributes of the displayed at least one animated graphical object according to the user-specified configuration settings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is one embodiment of a graphical user interface illustrating basic event settings for use with aspects of the invention.

DETAILED DESCRIPTION OF THE PREFERRED EMBODIMENTS

Figure 1:
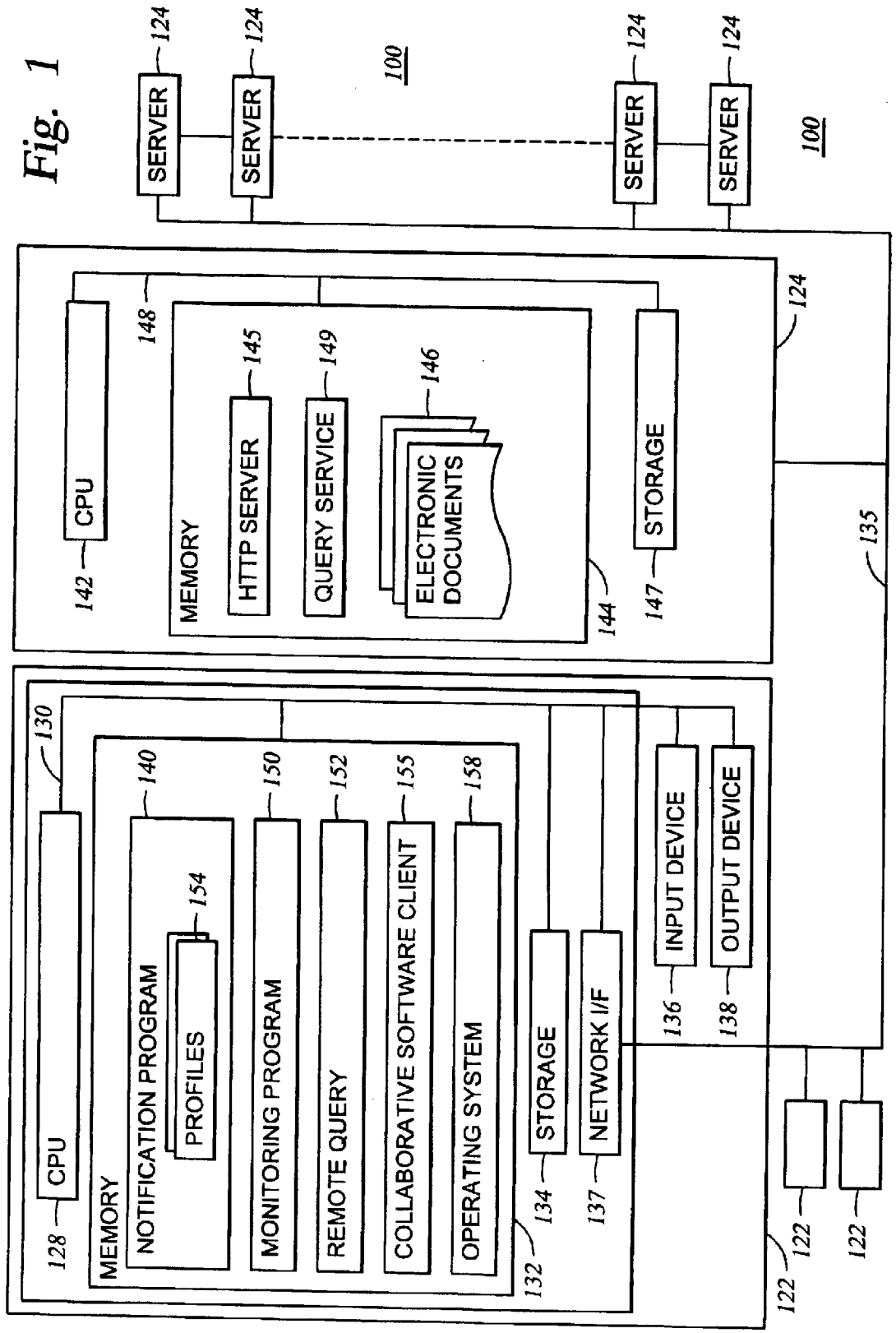
FIG. 1 depicts one embodiment of a networked computer system in accordance with aspects of the invention.

FIG. 1 depicts a block diagram of a networked system 100 in which embodiments of the invention may be implemented. In general, the networked system 100 includes a client (e.g., user's) computer 122 (three such client computers 122 are shown) and at least one server 124 (five such servers 124 are shown). The client computer 122 and the server computer 124 are connected via a network 135. In general, the network 135 may be a local area network (LAN) and/or a wide area network (WAN). In a particular embodiment, the network 135 is the Internet.

The client computer 122 includes a Central Processing Unit (CPU) 128 connected via a bus 130 to a memory 132, storage 134, an input device 136, an output device 138, and a network interface device 137. The input device 136 can be any device to give input to the client computer 122. For example, a keyboard, keypad, light-pen, touch-screen, trackball, or speech recognition unit, audio/video player, and the like could be used. The output device 138 can be any device to give output to the user, e.g., any conventional display screen or set of speakers along with their respective interface cards, i.e., video card and sound card. For purposes of describing embodiments of the present invention, the output device is a display device having a display screen. Although shown separately from the input device 136, the output device 138 and input device 136 could be combined. For example, a display screen with an integrated touch-screen, a display with an integrated keyboard, or a speech recognition unit combined with a text speech converter could be used.

The network interface device 137 may be any entry/exit device configured to allow network communications between the client computer 122 and the server computers 124 via the network 135. For example, the network interface device 137 may be a network adapter or other network interface card (NIC).

Storage 134 may be a Direct Access Storage Device (DASD). Although it is shown as a single unit, it could be a combination of fixed and/or removable storage devices, such as fixed disc drives, floppy disc drives, tape drives, removable memory cards, or optical storage. The memory 132 and storage 134 could be part of one virtual address space spanning multiple primary and secondary storage devices.

The memory 132 is preferably a random access memory sufficiently large to hold the necessary programming and data structures of the invention. While the memory 132 is shown as a single entity, it should be understood that the memory 132 may in fact comprise a plurality of modules, and that the memory 132 may exist at multiple levels, from high speed registers and caches to lower speed but larger DRAM chips.

The client computer 122 is generally under the control of an operating system 158, shown in the memory 132. Illustrative operating systems, which may be used to advantage, include Linux®, Palm® OS and Microsoft's Windows®. More generally, any operating system supporting the notification functions disclosed herein may be used.

Illustratively, the memory 132 includes a notification program 140 that, when executed on CPU 128, provides an animated notification service to one or more users and/or systems. In one embodiment, the notification program 140 includes a Graphical User Interface (GUI), which allows one or more users to manipulate settings and configurations of the notification program 140 including appearance and behavioral attributes of the animated notifications. For example, the notification program 140 may include one or more profiles 154 adapted to configure the notification program 140 for one or more users and/or operating settings. In one embodiment, the memory 132 further contains a monitor program 150 which, when executed on CPU 128, is used to monitor system status, such as CPU load, for example, and report the system status to the notification program 140. In a particular embodiment, the memory 132 also includes a remote query program 152 adapted to query the network 135 for events and system changes flagged by the notification program 140. For example, the remote query program 152 may be configured to send a message to the notification program 140 when a stock reaches a specified value. The notification program 140 then may retrieve and display an animated notification defined by the appropriate profile 154 associated with the stock value event.

The notification program 140 may also be used in tandem with a collaborative software client 155 such as a calendar program. While the notification program 140 may be a standalone program, it is contemplated that collaborative software client 155 and the notification program 140 may be combined to provide an integrated user interface. For example, the collaborative software client 155 may be an integrated software package such as Microsoft's Outlook® or Lotus's Lotus Notes® program adapted to integrate the reminder program operation with other functions such as a calendar. The notification program 140, the monitor program 150, the remote query program 152, and the collaborative software client 155 are discussed further with reference to FIGS. 2–9.

Each server computer 124 generally comprises a CPU 142, a memory 144, and a storage device 147, coupled to one another by a bus 148. Memory 144 may be a random access memory sufficiently large to hold the necessary programming and data structures that are located on the server computer 124. As shown, the memory 144 includes a server 145 (e.g., Hypertext Transfer Protocol server or application server) adapted to service requests from the client computer 122. For example, the server 145 may respond to requests to access electronic documents 146 (e.g., HTML documents) residing on the server 124. In one embodiment, the documents 146 are web pages each having an associated network address. In one embodiment, memory 144 further includes query service 149 that cooperates and communicates with the client side remote query program 152. The programming and data structures may be accessed and executed by the CPU 142 as needed during operation.

FIG. 1 is merely one hardware/software configuration for the networked client computer 122 and server computer 124.

Embodiments of the invention can apply to any comparable hardware configuration, regardless of whether the computer systems are complicated, multi-user computing apparatus, single-user workstations, hand-held devices (e.g., PDAs) or network appliances that do not have non-volatile storage of their own. Further, it is understood that while reference is made to particular languages, including HTML, the invention is not limited to a particular language, standard or version.

Figure 2:
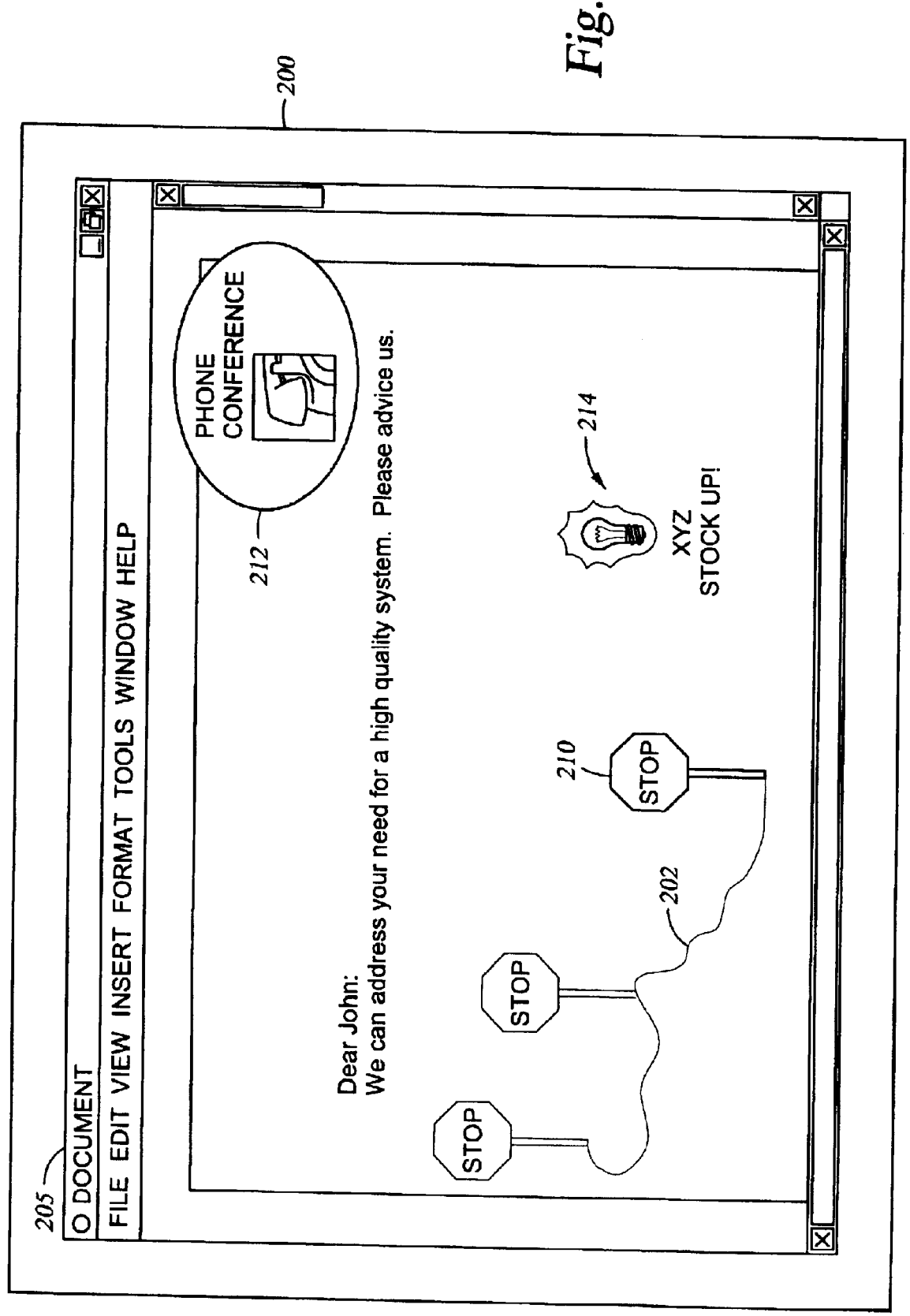
FIG. 2 is a simplified display of one embodiment of a graphical user interface for use with aspects of the invention.

FIG. 2 is a display area 200 representative of the output device 138. A portion of the display area 200 is occupied by a graphical user interface (GUI) 205. A plurality of animated graphic objects (three are shown) are displayed in conjunction with the GUI 205. The animated graphic objects may be configured in a plurality of ways in accordance with embodiments of the invention. For example, in one embodiment, a first animated graphical object 210 may be configured as a moving object, such as a moving stop sign, having a tail 202, a second animated graphical object 212 may be configured as a animated ringing telephone with an associated text message, and a third animated graphical object 214 may be a blinking stock price alert with associated sounds and animated text, alerting a user of a change in a company's stock price. The first, second and third animated graphical objects 210, 212, 214 are but a few examples of a plurality of contemplated animated graphical objects having one or more behavior and appearance attributes associated with one or more events such as time events and system events discussed with respect to FIGS. 3–9.

The behavior and appearances of the animated graphical objects are defined by one or more profiles 154. In one embodiment, the profiles 154 are configured via a plurality of interfaces which will be described with reference to FIGS. 3–5. In one embodiment, all or some of the user interfaces used to configure the profiles 154 are part of the collaborative software client 155. For example, the calendar program within a collaborative software client such as Lotus Notes® may be used to configure events associated with animated graphical objects. FIGS. 1 and 2 are referenced as needed for the description of FIGS. 3–5.

FIG. 3 is a graphical illustration of one embodiment of an animated event configuration dialog 300. The animated event configuration dialog 300 may be selected by selecting a basic attributes tab 302. The animated event configuration dialog 300 may be adapted to allow a user to define an event(s) which may be associated with one or more animated graphical objects and/or text. For example, the animated event configuration dialog 300 may be used to specify a beginning time and date from a begin time menu 306 and a begin date menu 308, respectively. If a time span for the display of the animated graphical object is desired, the time span may be set by further selecting a deadline time and date from a deadline time menu 320 and a deadline date menu 314, respectively. The animated event configuration dialog 300 may allow the entry of text messages associated with animated graphical objects using text message field 304.

In addition to time-based events, one or more animated graphical objects may be associated with one or more system events associated with the client computers 122 and/or the server computers 124, for example. For example, the monitoring program 150 may be configured to monitor the client computer 122 for system efficiency. When the monitoring program 150 detects that the computer 122 is not running according to a pre-determined efficiency, the monitoring program 150 may alert the notification program 140. For example, a computer health monitoring program such as Microsoft's system monitor® program may be used to trigger and/or configure the system event type and/or threshold of predetermined system event levels such as CPU load, memory allocation, and the like.

In one embodiment, the importance of an event relative to other events may be associated to an animated graphical object. An importance attribute (such as high, medium, low) may be selected from an importance attribute menu 322. The importance attribute may be configured to change depending upon the event. For example, the importance attribute may be configured to change over a predetermined time span established between the start time and deadline time. For example, if a start time and deadline time were set to alert a user of a meeting one hour before the meeting, the animated graphical object may start at a lower importance setting an hour before a meeting and gradually change to a higher importance setting as the meeting time approaches. In another example, the importance attribute may change in relation to a critical system event such as critical CPU load. For example, CPU load and network speed may be two metrics being monitored by the monitor program 150 and which have associated animated graphical objects which are invoked upon the metrics reaching specified values. The specified values may be assigned relative weights (the importance attribute) such that the more critical metric (as defined by its weighted value) is given priority/emphasis. The manner in which priority/emphasis is exhibited may include, for example, making the animated graphical object associated with the more critical metric more prominent on the screen, assuming both metrics have reached a level which triggers their associated animated graphical object.

To accommodate reoccurring time events such as birthdays, holidays, meetings, and the like, the animated event configuration dialog 300 may also include a repeat event selection menu 324. The repeat event menu 324 may include preset times such as hourly, daily, weekly, and so forth. For example, the animated graphical object may be configured to start on a particular day each week to remind a user of a weekly meeting.

Figure 6:
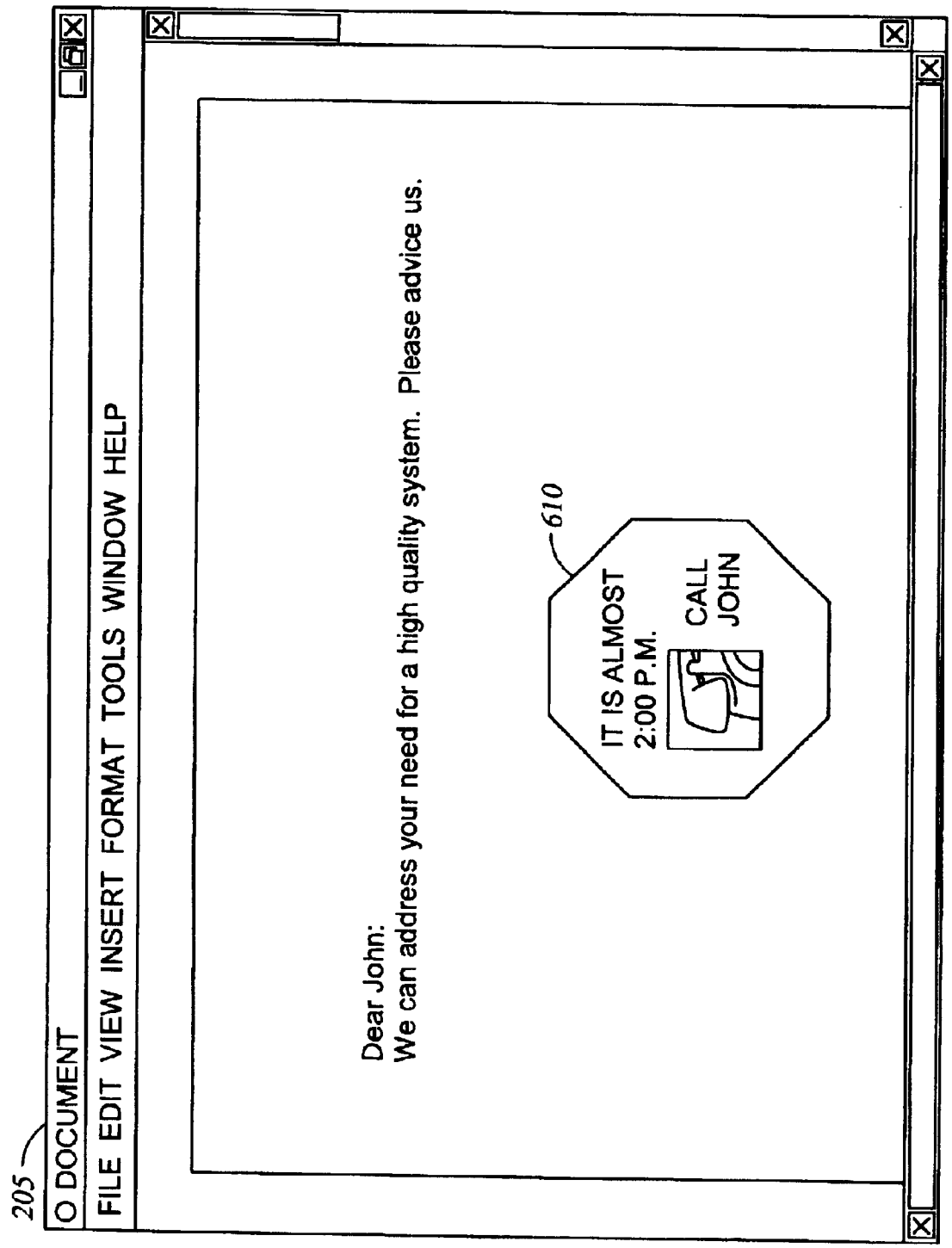
FIG. 6 is a simplified display of one embodiment of a graphical user interface and one type of animated event reminder.

In one embodiment, visual and audio attributes are associated with the animated graphical objects. Accordingly, the event configuration dialog 300 includes an image menu 312 and a sound menu 316. One configuration using selections from the image menu 312 and the sound menu 316 can be illustrated with respect to FIG. 6. FIG. 6 shows a graphical user interface 205 in which the selected image is an animated telephone image 610 having an associated text message 612. The animated telephone image 610 may be configured by selecting a telephone image from the image selection menu 316 and associated telephone sound from the sound menu 318. In another embodiment, a previously configured profile 154 may be used by selecting the "piggyback on" check box 310. Having selected the check box 310, a profile selection menu 312 is made available from which a previously configured profile may be selected by name. Alternatively, "piggyback on" may refer to overloading a particular object with associations to more than one event. This may be useful where a user has multiple contemporaneously occurring events but prefers to avoid excessively cluttering the viewable screen area with individual objects from each event.

Figure 4:
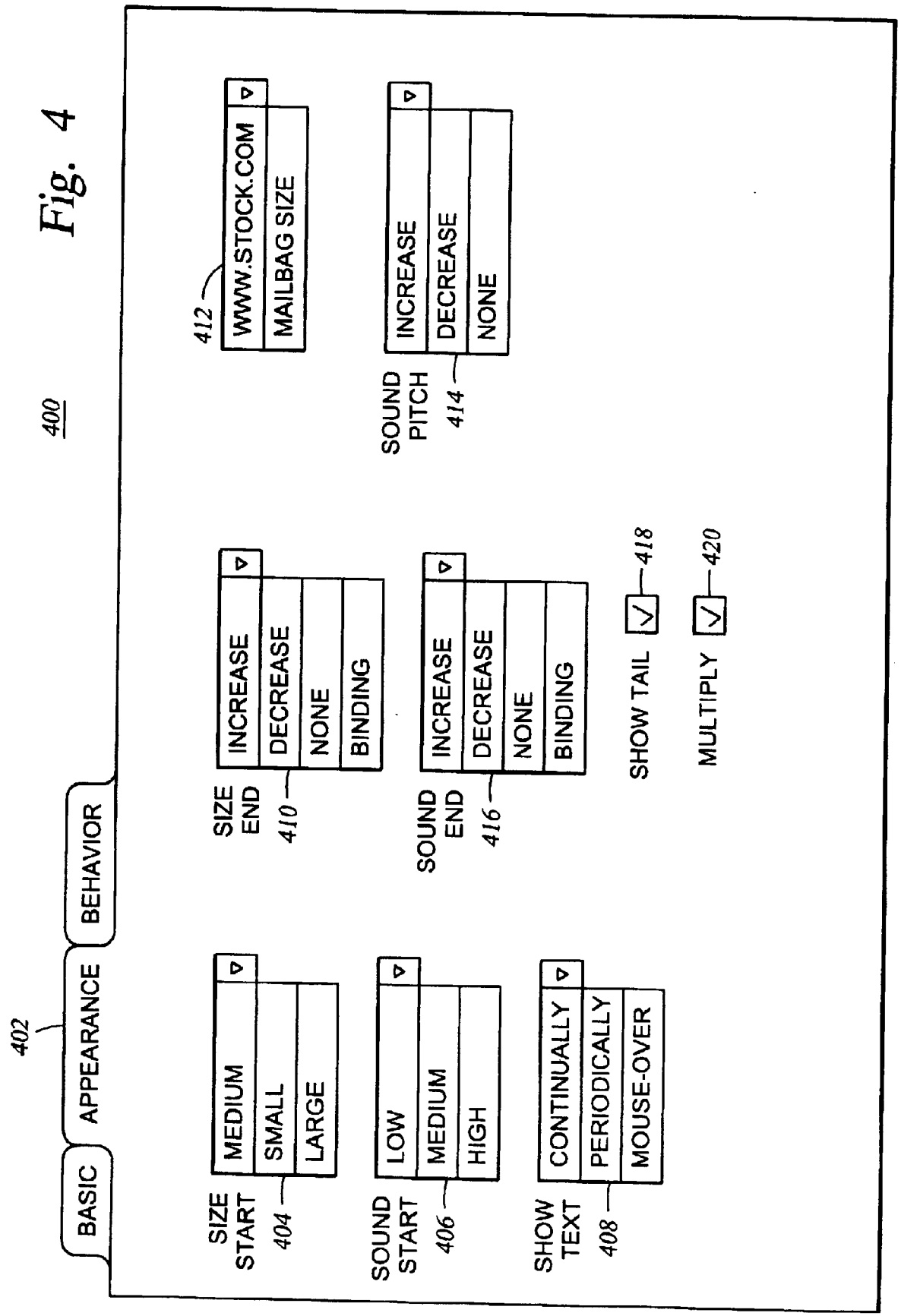
FIG. 4 is one embodiment of a graphical user interface illustrating appearance settings for use with aspects of the invention.

FIG. 4 is a graphical illustration of one embodiment of an animated appearance configuration dialog 400. The appearance configuration dialog 400 may be selected by selecting an appearance tab 402. In one embodiment, the animated appearance configuration dialog 400 may be adapted to define animated object appearance attributes such as size, associated text and other appearance effects for animated graphical objects. The animated appearance configuration dialog 400 may also be adapted to associate sound attributes such as pitch, type of sound, volume, and tone to the animated graphical objects for the sound selected from a sound menu 316 (See FIG. 3).

In one embodiment, a start size menu 404 and size end menu 410 may configure the starting and ending size of the animated graphical objects. In some cases, it may be desirable to cause the animated object to change its size as a reflection of importance. For example, an increasing size may be selected for an event having a lower importance, and a decreasing size may be selected for a higher importance.

A sound associated with an object may also be configured to change according to the event by making selections from a start sound menu 406 and an end sound menu 416. For example, the sound of an animated graphical object used to remind a user of an upcoming meeting may be soft at the start time but may increase in volume as the meeting time (e.g., the deadline time) approaches. In another embodiment, the pitch of the sound may be altered (e.g., increased, decreased) using a sound pitch menu 414. For example, the pitch for an animated graphical object used to remind a user of an upcoming meeting may be low at the start time but may increase in frequency as the meeting time (e.g., the deadline time) approaches.

In one configuration, text (from text filed 304) is used in conjunction with the animated graphical object to deliver a message to a user about a particular event. For example, as illustrated in FIG. 6, the text message 612 "It's almost 2PM . . . call John" may represent a message to convey a reminder to a user to call the person named "John" at 2PM. The animated appearance configuration dialog 400 is also configured to allow control over when the text message 612 is shown. For example, using the show text menu 408, the text message 612 can be displayed in conjunction with the associated animated graphical object continuously, periodically, or only when a mouse cursor is held in proximity to the animated graphical object.

Figure 7:
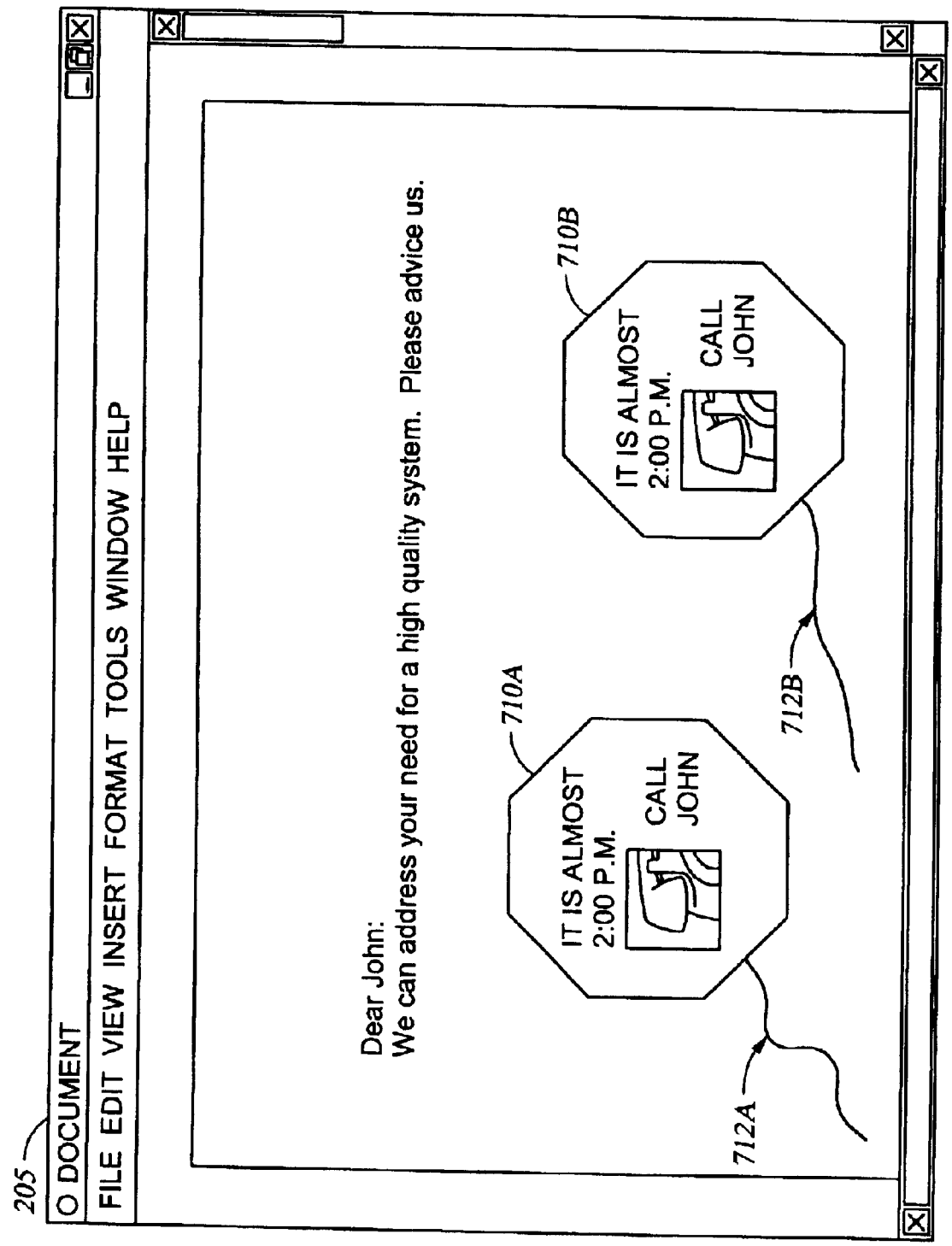
FIG. 7 is a simplified display of one embodiment of a graphical user interface and one type of animated event reminder.
Figure 8:
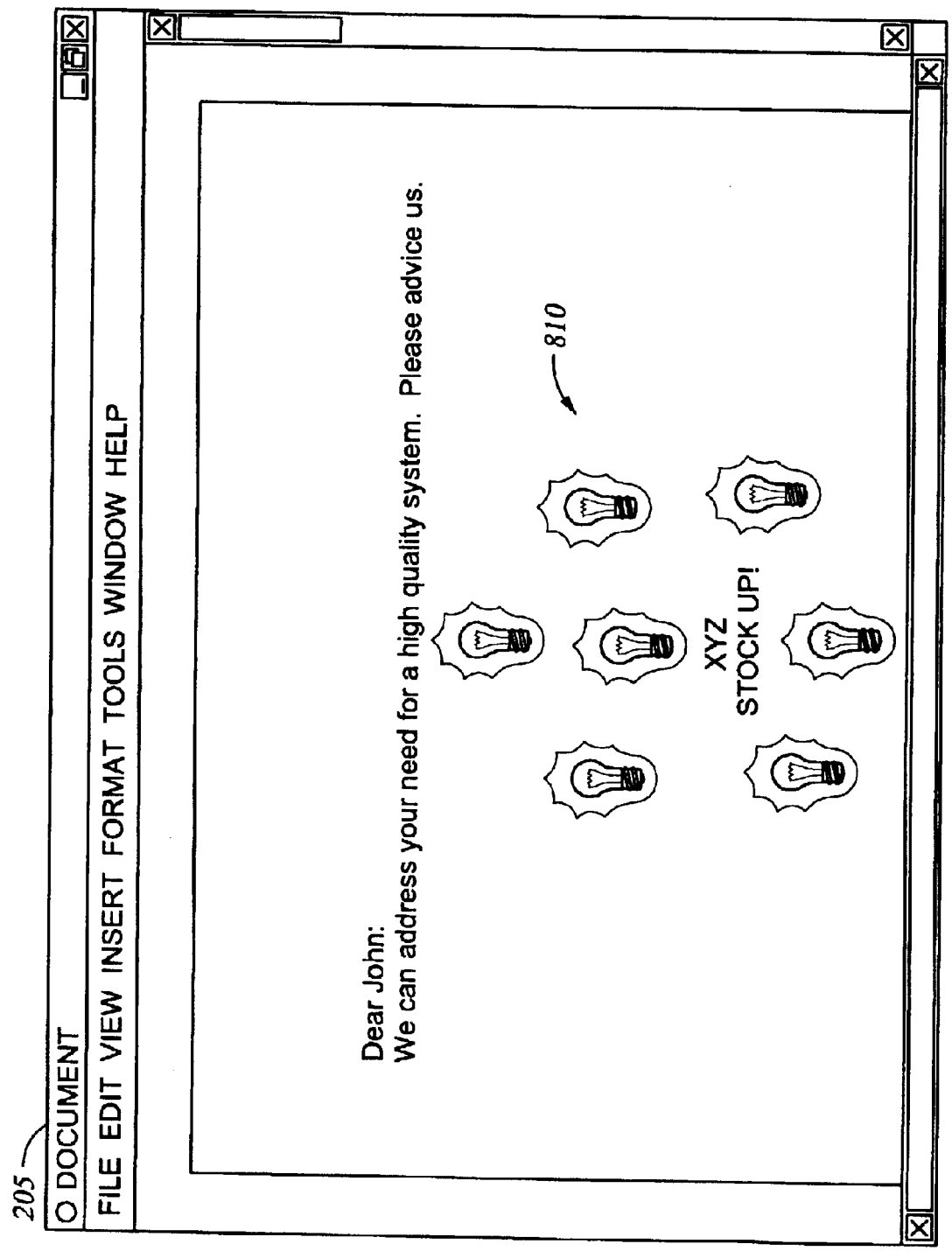
FIG. 8 is a simplified display of one embodiment of a graphical user interface and one type of animated event reminder.

In one embodiment, the animated graphical objects may be configured with a "tail" (as illustrated by the tail 202 in FIG. 2) by checking the "show tail" checkbox 418. The animated graphical objects may also be configured to multiply (e.g. spawn, clone) by checking the "multiply" checkbox 420. Multiplication can be illustrated with reference to FIG. 7. The animated graphical objects 710A and 710B in FIG. 7 are identical copies from the original animated telephone object 610 and are each configured with respective tails 712A and 712B. It is contemplated that attributes of the tail such as the tail length may be fixed or variable and may change in relation to other attributes such as importance. For example, the tail may be configured to grow as the reminder attribute increases in importance. It is also contemplated that the multiply function may be configured to change the number of copies in response to changes in the attributes such as importance. For example, as illustrated in FIG. 8, a plurality of animated light bulb images 810 may be used to indicate the fact that the stock price of a company has increased, e.g., the higher the stock price from a predetermined value, the more light bulb images 810. The multiply feature may also be used to reflect the proximity in time of an event. For example, a single animated graphical object may be used at the beginning of a timed event to alert the user to a meeting. As the meeting time approaches (e.g., the deadline time) the single animated graphical object may increase until most of the graphical user interface 205 is covered, thereby providing the user with a more intense reminder. These and other behavioral features of an object may be defined in a separate screen referred to herein as an "animated behavior configuration screen", which is described below with reference to FIG. 5.

It is noted that the dialog 400 includes a size end menu 410 and the sound end menu 416 include a "binding" menu option. As used herein, binding refers to the association of another event, program, value or calculated value for purposes of defining an attribute of the object. The particular event to be bound with is selected from a binding menu 412. Binding will be described in more detail below with respect to FIG. 5.

Figure 5:
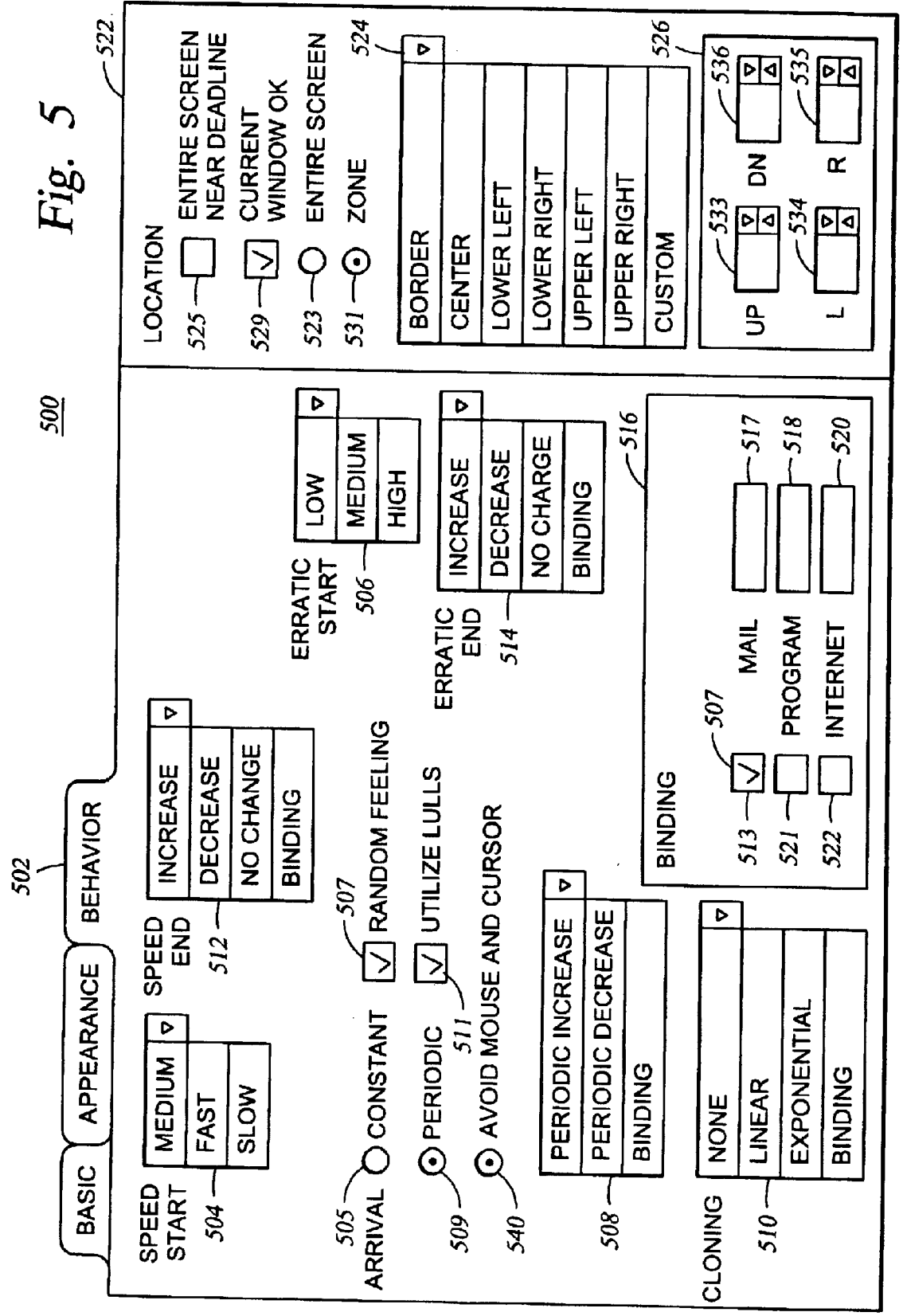
FIG. 5 is one embodiment of a graphical user interface illustrating behavior settings for use with aspects of the invention.

FIG. 5 is a graphical illustration of an animated behavior configuration dialog 500. The animated behavior configuration dialog 500 may be selected by selecting a behavior tab 502. The animated behavior configuration dialog 500 may be adapted to associate animated object behavior attributes such as speed, movement, and the like, to the animated graphical objects. The animated behavior configuration dialog 500 may also be adapted to configure behavior attributes such as location on the display screen, cloning (i.e., multiplying), and the like. In one embodiment, the animated behavior configuration dialog 500 may be adapted to configure the starting animation speed between a plurality of settings such as slow, medium, fast, and the like by making a selection from a speed start menu 504. In one configuration, the speed of animation may be changed over time by further selecting a menu item from an ending speed menu 512. Illustratively, the speed may be set to increase, decrease, remain constant, or be bound to some other event or program. For example, a user may set a meeting reminder animated graphical object to start one hour before the meeting with a slower animation and as the meeting time approaches (e.g., the deadline time) the speed of the animation increases.

The erratic movement behavior of the animated graphical object may be set using a start erratic behavior menu 506 and the stop erratic behavior menu 514. Illustratively, the erratic behavior may be set to increase, decrease, remain constant, or be bound to some other event or program. For example, at the beginning of an event, an erratic behavior may be zero and then increase to a larger value as the event end nears. Consider the case of an animated graphical fly image. At the beginning, a fly image may be set to "sit" on the GUI 205 motionless. However, as the deadline of the event approaches the fly image may begin to flutter about the GUI 205 more and more erratically.

If the multiply was selected (by checking the checkbox 420 of the dialog 400), then the frequency of multiplication may be configured from the dialog 500 using a cloning selection menu 510. The cloning/multiplication behavior may be set to increase linearly, increase exponentially, remain constant (no cloning), or be bound to some other event or program. For example, in the case of exponential cloning, the rate of cloning may initially be zero and then increase to a larger value as the event end nears. Consider again the case of an animated graphical fly image. At the beginning, the number of fly images may be set to one on the GUI 205. However, as the deadline of the event approaches the fly may begin to multiply about the GUI 205 at a specified rate.

In one embodiment, the location of the animated graphical objects may be configured so that the animated graphical objects are restricted to one or more regions of the display area 200 or GUI 205. For example, one or more of the animated graphical objects may be constricted by selecting a particular area of the display area 200 or GUI 205 using, for example, an "entire screen" radio button 523, "entire screen near deadline" checkbox 525, current window OK checkbox 529 allowing or disallowing motion over the currently active window (in the case of multiple open windows) or a zone (i.e., region of the display) from the "zone" radio button 531 and a zone selection menu 524. The entire screen radio button 523 may allow the animated graphical objects unrestricted display of the entire display area 200. If the animated graphical objects are configured to multiply/clone, the "entire screen near deadline" checkbox 525 may allow the animated graphical objects to cover the entire GUI 205 as the deadline time approaches. The zones from the zone selection menu 524 may include all of the display area 200, the current application window (e.g., GUI 205), and may be configured for example, to display on the GUI 205, near a boarder of the GUI 205, move around the center, move near a lower left or right hand region, move near a upper left or right hand region, or move within a custom location of the GUI 205. In one embodiment, selecting "custom" from the zone selection menu 524 allows the user to customize the zone by using the zone configuration selection menu 526. The zone configuration selection menu 526 may include four position menus, left, right, up, and down 533–536, adapted to define the position of the animated graphical object to a particular region (i.e. zone) of the GUI 205. For example, the left and right position selection menus 534 and 535 may be used to constrain the animated graphical object to the left side or right side of the GUI 205.

As illustrated in FIG. 5, selected menus include a "binding" option. As noted above, binding refers to a mechanism for associating attributes to animated graphical objects defined by another event or program. The attribute bound to an animated graphical object is defined by a binding configuration box 516. In one aspect, a binding attribute may associate the appearance and behavior of one or more animated graphical objects to an email event by selecting the "mail" check box 513. Mail rule selection menu 517 is provided to allow selection of a mail rule profile. Mail rules are well known and allow users to control the receipt of mail by, for example, restricting receipt from certain individuals or restricting receipt of mail containing specified content. If multiple mail clients are available, a selection menu may be provided from which to select one of the available mail clients. In one aspect, the binding may associate the appearance and behavior of one or more animated graphical objects to a program function by entering a program address path into the program field 518 and checking the "program" checkbox 521. For example, to bind one or more animated graphical objects to a system event, the address path of the monitoring program 150 may be entered in the program field 518. When a system event being monitored by the monitoring program 150 occurs, the notification program 140 activates one or more animated graphical objects that are bound to the system event or value. The binding may also associate one or more animated graphical objects with a network event linked to an external trigger such as the increase in a stock price of a company. This is facilitated by the provision of an Internet checkbox 522 and associated field 520. In one embodiment, selecting the Internet checkbox 522 invokes the use of the remote query program 152 and the query service 149. Specifically, selecting the Internet checkbox 522 makes the field 520 available for specifying a URL of the query service 149. In one embodiment, the remote query program 152 is used to poll the network 135 for network events being monitored by the query service 149. When the remote query program 152 detects a network event, the remote query program 152 may alert the notification program 140 of the network event. In response to the alert, the notification program 140 may activate one or more animated graphical objects bound to the event. For example, a stock related image such as a company logo may be bound to a particular company stock. The remote query program 152 may receive a network event from a network query service program 149 (See FIG. 1) adapted to monitor the desired company's stock price. At a user determined stock price threshold, network query service program 149 alerts the notification program 140 of the price. In response to the alert, the notification program 140 may activate one or more animated graphical stock certificates "bound" to the lower stock price to alert the user to the lower price. If so configured in the associated profile 154, the one or more animated stock certificates may change to reflect continuing price increase. For example, the one or more animated graphical stock certificates may multiply until most of the graphical user interface 205 is covered, thereby providing the user with a dynamically responsive notification of the stock's behavior.

In one embodiment, the arrival (i.e., the display time relative to the event) of the animated graphical objects may be configured using the "constant arrival" radio button 505, or the "periodic arrival" radio button 509. The "constant arrival" radio button 505 may allow the animated graphical objects to be displayed continuously when the event occurs (i.e., never go away unless turned off). As illustrated in FIG. 6, the animated telephone object 610 may be configured to float about the GUI 205 until the event time has lapsed or the user turns off the animated telephone object 610. The "periodic arrival" radio button 509 may be used to configure an animated graphical object to be displayed periodically (i.e., displayed for intermittent intervals of time, duty cycle). For example, the notification program 140 may be set to display the animated graphical object for a few seconds every so many minutes. In one embodiment, the user can select an increase or decrease in the periodic time by selecting a periodic increase or a periodic decrease from the periodic display time from the periodic time selection menu 508. The user may also select the "feel" of the animated graphical object by selecting a "random" checkbox 507 and/or "utilizing lulls" checkbox 511 when the "periodic arrival" radio button 509 is selected. The "random" checkbox 507 sets the notification program 140 to randomly display the animated graphical object. The "utilizing lulls" checkbox 511 may allow the user to set the arrival of the animated graphical object when the computer is not actively being used by the user, e.g., a lull, thereby allowing the reminder to be more intense during periods of non-computer use.

In one embodiment, the animated graphical object(s) responds to the position of the text cursor and/or mouse pointer by selecting the radio button 540. Specifically, the animated graphical object is thereby configured to maintain a specified distance (which, in one embodiment, is specified by the user) from the text cursor and/or mouse pointer. Such behavior may be desirable to prevent the animated graphical object from substantially interfering with a user's activity while still serving to notify the user of an event. It is contemplated that when the radio button 540 is selected to invoke such behavior, the user may still purposefully move the mouse pointer onto the animated graphical object (e.g., in order to disable the animated graphical object).

Figure 9:
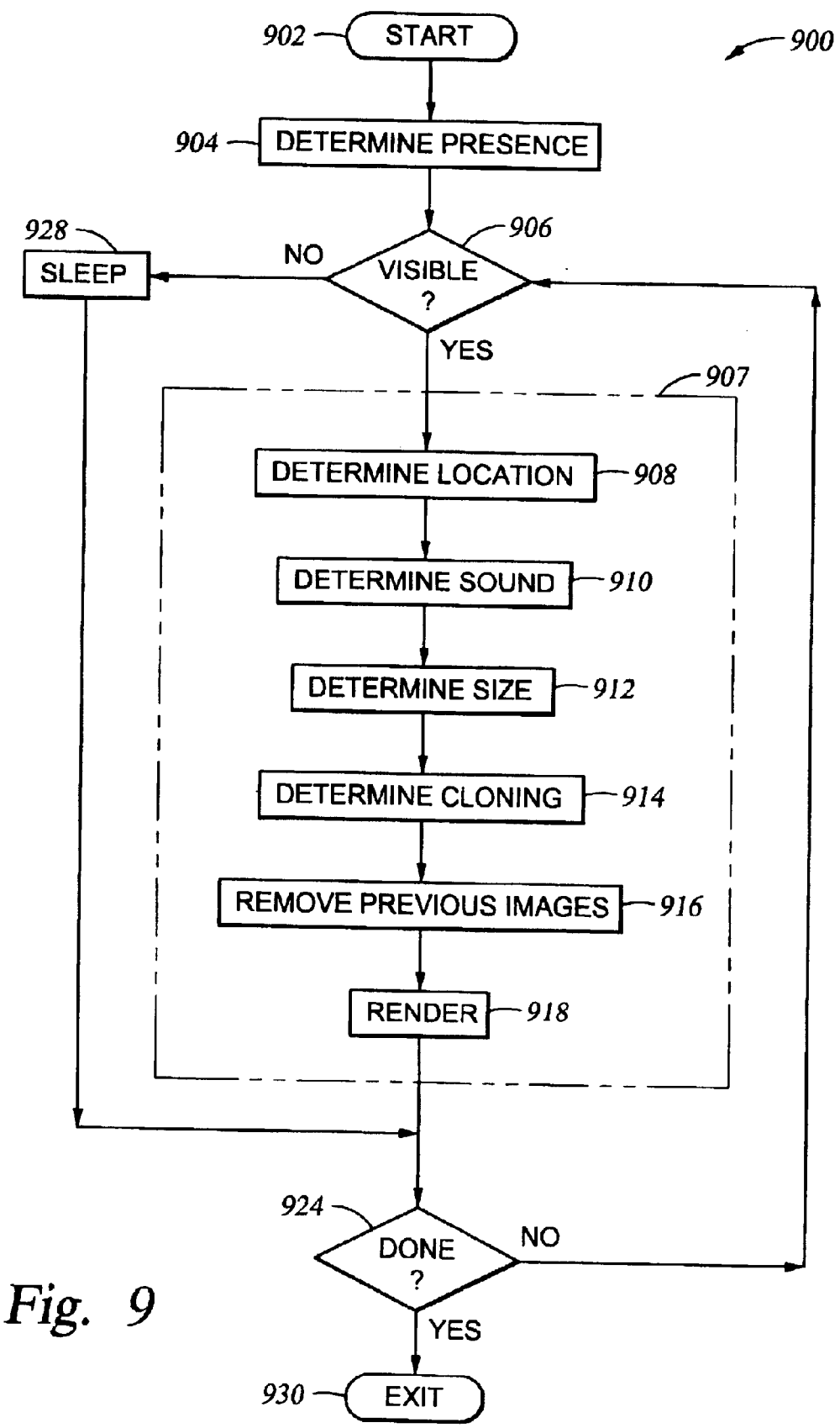
FIG. 9 is a flow diagram of one embodiment of a method for establishing an animated event reminder configuration in accordance with aspects of the invention.

FIG. 9 is a flow diagram of a method 900 for generating one or more animated graphical objects in accordance with aspects of the invention. FIGS. 1-8 are referenced within the following discussion of FIG. 9 as is necessary.

Specifically, the method 900 starts at step 902 and proceeds to step 904. For each animated graphical object at step 904, the method 900 determines the presence of the animated graphical object. That is, a determination is made as to whether an event occurred to trigger the notification program 140 and activate one or more animated graphical objects. For example, presence may be determined from one or more attributes such as arrival, binding, random feeling, utilizing lulls and other attributes configured from the animated event configuration dialog 300, animated appearance dialog 400, and animated behavior dialog 500.

At step 906, the method 900 determines if the animated graphical object should be displayed. If the animated graphical object should not be displayed e.g., only displays periodically, or not at all, the method 900 proceeds to step 928 where processing for the given animated graphical object is paused for a predetermined period. After the predetermined period, the method 900 determines (step 924) whether processing is complete for the particular animated graphical object (e.g., the user has off the notification or the event deadline has passed). If so, the method 900 exits at step 930. Otherwise, the method 900 proceeds to step 907.

At step 907 attributes for the animated graphical object such as animation, sound, arrival, location, movement, cloning, and the like, may be applied. Illustratively, step 907 is represented as a plurality of sub-steps to determine the attribute configuration. However, the sub-steps are merely illustrative of a particular example and are not limiting of the present invention. For example, at step 908 the method 900 may determine the location of the animated graphical object from a location selection from the zone selection menu 524. The sound attributes associated with the animated graphical object may be determined at step 910 using the sound configurations set from one or more of the sound menu 316, the profile menu 318, the start sound menu 406, the end sound menu 416, and the sound pitch menu 414. At step 912, the method 900 may determine the size attributes of the animated graphical object from one or more selections from the start size menu 404, the end size menu 410, and the image menu 412. At step 914, the method 900 determines the amount of multiplying/cloning using, for example, one or more selections from the cloning menu 510, and the "multiply" checkbox 420. Of course, any number of the attributes may be defined by the binding mechanism described above, if so selected by the user.

To impart motion to the animated graphical object, the method 900 iteratively refreshes, i.e., deletes the animated graphical object at step 916, and redraws (i.e., renders), the object on the display area 200 or GUI 205 at step 918. The method 900 proceeds to step 924 to determine whether processing for the particular animated graphical objects is complete. If so, then the method 900 exits at step 930. If not, then the method 900 returns to step 906.

The foregoing describes a variety of embodiments of the invention. However, it is understood that the invention is capable of numerous other adaptations and configurations. Having understood the aspects of the invention disclosed herein, persons skilled in the art will readily identify other embodiments within the scope of the invention. For example, a snooze feature may be provided to allow a user to temporarily disable the animated graphical object(s). Further, the animated graphical object(s) mode of behavior may be changed. For example, the animated graphical object(s) may be initially configured to change colors (a first mode of behavior) and later change in size (a second mode of behavior). Further, an object's behavior in a given mode or its propensity to change modes of behavior over time, may be related to an approaching deadline. For example, in one embodiment, the animated object is related to a percentage of the event completed. For example, a one-hour notification would be zero percent complete at the beginning of the hour and one hundred percent complete at the end of the hour. The percentage complete is then used to establish the appearance of the animated graphical object(s). For example, if the event is a time event such as a one-hour notice prior to a meeting, an animated graphical object(s) may be set to a slow speed at the beginning of the hour and increase in speed as the end of the hour approaches. Accordingly, at fifty percent of the hour (i.e., thirty minutes) the new presence may be a speed of fifty percent of the end speed set in the ending speed menu 512 (See FIG. 5).

While the foregoing is directed to embodiments of the invention, other and further embodiments of the invention may be devised without departing from the basic scope thereof, and the scope thereof is determined by the claims that follow.

What is claimed is:

1. A method of generating a computer-based notification, comprising:
   receiving user-specified configuration settings of a notification responsive to an event wherein the event is a calendar event, the notification comprising at least one animated graphical object;
   activating, when the event occurs, the at least one animated graphical object; and
   displaying the at least one activated animated graphical object on a display; and
   modifying one or more attributes of the displayed at least one animated graphical object according to the user-specified configuration settings,
   wherein modifying the one or more attributes comprises modifying at least one behavior of the one or more animated graphical objects.

2. The method of claim 1, wherein the notification is a personalized reminder to a user to perform a specified action.

3. The method of claim 1, wherein the event is monitored and detected by a network program executing remotely, and the configuration settings associate the animated graphical object with the network program.

4. The method of claim 1, wherein the at least one animated graphical object comprises a single animated graphical object having an existing association with another event so that the configuration settings operate to associate at least two events with the single animated graphical object.

5. The method of claim 1, wherein the configuration settings comprise a plurality of attributes of the animated graphical object.

6. The method of claim 5, wherein the plurality of attributes comprise behavior attributes and appearance attributes.

7. The method of claim 6, wherein the behavior attributes comprise at least one of speed, size, duration of display, multiplication of the animated graphical object and combinations thereof.

8. The method of claim 6, wherein the behavior attributes comprise at least one of a change in direction, periodicity of display and combinations thereof.

9. The method of claim 6, wherein the appearance attributes comprise at least one of size, color, shape, associated text, associated sound and combinations thereof.

10. The method of claim 1, wherein the configuration settings restrict movement of the animated graphical object within a defined region of the display screen.

11. The method of claim 10, wherein the defined region of the display screen comprises an open graphical user interface window.

12. A computer readable medium containing a notification program which, when executed, performs a notification operation, comprising:

determining when a user-specified event wherein the event is a calendar event occurs;

activating, according to user-specified configuration settings, one or more animated graphical objects in response to the event;

displaying the one or more animated graphical objects on a display; and modifying attributes of the displayed one or more animated graphical objects according to the user-specified configuration settings, wherein modifying the attributes comprises modifying at least one behavior of the one or more animated graphical objects.

13. The computer readable medium of claim 12, wherein the one or more animated graphical objects is a single animated graphical object associated with at least two user-specified events.

14. The computer readable medium of claim 12, wherein the event is selected from a time-based event, a system event, and combinations thereof.

15. The computer readable medium of claim 12, wherein the at least one behavior comprises at least one of speed, size, geometry of motion on the display and combinations thereof.

16. The computer readable medium of claim 12, wherein modifying the at least one behavior of the animated graphical objects is done with respect to an approaching deadline of the event.

17. The computer readable medium claim 12, wherein the event is monitored and detected by a network program executing remotely, and the user-specified configuration settings associate the one or more animated graphical objects with the network program.

18. The computer readable medium of claim 17, wherein the network program monitors a price.

19. The computer readable medium of claim 12, wherein in the user-specified configuration settings restrict movement of the animated graphical object within a defined region of the display.

20. The computer readable medium of claim 19, wherein the defined region of the display screen comprises an open graphical user interface window.

21. A computer, comprising:

a display;

a data repository containing (i) event information specifying a plurality of user-defined events wherein the event is a calendar event and (ii) one or more animated graphical objects associated with the plurality of user-defined events, wherein attributes of the animated graphical objects are user-defined;

a notification program; and a processor configured to at least execute the notification program and perform an operation, comprising:

determining an occurrence of a user-defined event;

activating, according to user-specified configuration settings, at least one animated graphical object in response to the user-defined event;

displaying the at least one animated graphical object on the display; and modifying attributes of the displayed at least one animated graphical object according to the user-specified configuration settings, wherein modifying the attributes comprises modifying at least one behavior of the one or mow animated graphical objects.

22. The computer of claim 21, wherein the event comprises one of a time-based event and a system event.

23. The computer of claim 21, wherein the attributes comprise appearance and behavior attributes.

24. The computer of claim 23, wherein the appearance attributes comprise at least one of size, color, shape, associated text, associated sound and combinations thereof.

25. The computer of claim 21, wherein the behavior attributes comprise at least one of speed, movement, location on the display, multiplication of the at least one animated graphical object and combinations thereof.

26. The computer of claim 21, further comprising a network connection to a remote system executing a monitoring program configured to detect the occurrence of the user-defined event and relay detection of the occurrence to the computer via the network connection.

27. The computer of claim 26, wherein the attributes comprise appearance and behavior attributes comprising at least one of size, color, shape, associated text, associated sound, speed, movement, location on the display, multiplication of the at least one animated graphical object and combinations thereof.

* * * * *